United States Patent [19]

Rieder et al.

[11] Patent Number: 4,636,079
[45] Date of Patent: Jan. 13, 1987

[54] OPTOELECTRONIC METHOD OF MEASURING THE EXTENT OF A MOVEMENT AND OPTOELECTRONIC MEASURING INSTRUMENT FOR CARRYING OUT THE METHOD

[75] Inventors: Heinz Rieder, Sankt Pantaleon; Max Schwaiger, Ostermiething; Harald Swatek, Sankt Michael, all of Austria

[73] Assignee: RSF Elektronik OHG Rieder & Schwaiger Gesellschaft m.b.H., Tarsdorf, Austria

[21] Appl. No.: 672,575

[22] Filed: Nov. 16, 1984

[51] Int. Cl.[4] .............................................. G01B 11/14
[52] U.S. Cl. ................................. 356/374; 250/237 G
[58] Field of Search .............................. 356/373–375; 250/376; 33/125 A, 125 C; 329/110

[56] References Cited

U.S. PATENT DOCUMENTS 4,472,629 9/1984 Ort ................................... 250/237 G
4,516,250 5/1985 Grimes ................................ 329/110

FOREIGN PATENT DOCUMENTS 2942080 4/1981 Fed. Rep. of Germany .

Primary Examiner—R. A. Rosenberger
Assistant Examiner—Crystal D. Cooper
Attorney, Agent, or Firm—Karl F. Ross; Herbert Dubno

[57] ABSTRACT

A scanning unit comprises offset scanning gratings and light receivers disposed behind respective gratings. The scanning unit is moved past an incremental scale and the receivers are illuminated through the scale and the gratings. Carrier frequency signals which are displaced in phase and are amplitude-modulated in dependence on the pitch of the scale are generated in response to the scanning movement. The phase displacement of the modulation of the carrier signal is evaluated to determine the instantaneously scanned fraction of a scale increment in that a proportional number of clock pulses are counted by a counter. The use of a simple and reliable circuit arrangement and a reliable evaluation are permitted in that the illumination is modulated at the carrier frequency so that the light receivers constitute means for effecting an amplitude modulation of the carrier frequency signal. The amplitude-modulated signal is then processed further. The modulating signals corresponding to full scale increments may be separately detected and may be used to detect the direction of the scanning movement and to measure the full scale increments which have been scanned.

24 Claims, 3 Drawing Figures

OPTOELECTRONIC METHOD OF MEASURING THE EXTENT OF A MOVEMENT AND OPTOELECTRONIC MEASURING INSTRUMENT FOR CARRYING OUT THE METHOD

FIELD OF THE INVENTION

This invention relates to an optoelectronic method of measuring the extent of linear or angular movements, wherein an incremental scale is employed as well as a scanning unit which comprises a plurality of scanning gratings, which are spaced apart along the scale and are offset different fractions of a scale increment from the adjacent increments of the scale, and which scanning unit is moved along the scale, a plurality of light receivers associated with respective ones of the gratings are illuminated with light which has been projected onto the scale and which is incident on each light receiver from the associated grating in such manner that the illumination of each light receivers varies in accordance with a sine function that has a spatial frequency related to the pitch of the scale and which is displaced in phase from the sine function of the illumination of the other light receiver, whereby amplitude-modulated carrier frequency signals which are displaced in phase from each other are generated in response to the illumination and the scanning movement of the gratings relative to the scale, said modulated carrier frequency signals are combined to generate a resultant signal, which is displaced in phase from a reference signal by a phase displacement that is proportional to the instantaneously scanned fraction of an increment of the scale, and the resultant signal is processed to produce in dependence on its phase displacement a control signal, which is utilized to control the counting of clock pulses in a number that depends on the phase displacement, and the clock pulses are counted by a clock pulse counter in a sense which depends on the direction of the movement of the scanning unit relative to said scale.

This invention relates also to a measuring instrument for carrying out the method, comprising an incremental scale, a scanning unit which is movable along the scale and having a plurality of scanning gratings, which are spaced apart along the scale and are offset different fractions of a scale increment from the adjacent increments of said scale, a plurality of light receivers associated with respective ones of the gratings, a light source which is operable to illuminate said light receivers with light which has been projected onto the scale and which is incident on each light receiver from the associated grating in such manner that the illumination of each light receivers varies in accordance with a sine function that has a spatial frequency related to the pitch of the scale and which is displaced in phase from the sine function of the illumination of the other light receivers, a clock, a frequency divider connected to the output of a clock for generating clock pulses, a frequency divider for deriving from the clock pulses an alternating carrier frequency signal which constitutes a reference signal, means for generating amplitude-modulated carrier frequency signals which are displaced in phase from each other in response to said illumination and a scanning movement of the scanning unit relative to the scale, signal processing circuitry for combining the modulated signals so as to generate two quadrature signals, said signal processing circuitry comprising an output stage for combining the two signals in quadrature and to generate a resultant signal, which relative to the reference signal has a phase displacement that is proportional to the just scanned fraction of an increment of the scale, a phase detector for generating a control signal in dependence on the phase displacement of the resultant signal, a counter for counting the clock pulses in a number corresponding to the fraction of the scale increment under the control of the control signal and in a sense that depends on the direction of the movement of the scanning unit relative to the scale.

BACKGROUND OF THE INVENTION

In known methods and measuring instruments of the kind described above, the light emitters are operated with a constant luminous intensity and the light receivers generate basically sinusoidal analog signals, which are displaced in phase from each other and have a width corresponding to the pitch of the scale. In some of the conventional measuring methods, the outputs of a plurality of light receivers are combined to generate two quadrature signals (sine and cosine signals), which are evaluated. If a square wave signal is derived from the zero crossings of the two analog quadrature signals, four pulses will be obtained per scale increment. Frequency multiplier circuits may be used to derive more than two analog signals from the two quadrature signals and a square wave signal may be derived from the zero crossings of the analog signals. In that manner, up to 20 pulses can be generated per scale increment. But such circuits are costly and the waveforms of the signals may be distorted by interference and by a fluctuation of the d.c. component of the signals so that the electronic division of each scale increment may lead to objectively incorrect results.

It has also been proposed to generate pulses in a number which is theoretically as high as desired per scale instrument, usually pulses in a number of an order from 100 to 1000. Such methods and instruments are basically known from Laid-open German Application No. 29 42 080. As has been described, the light receivers generate two analog sine signals, which are displaced 90° in phase and which contain a d.c. voltage component. A clock is connected by a frequency divider to a pulse-shaping circuit, which generates two sine a.c. voltages which are at a predetermined carrier frequency and are displaced 90° in phase. The analog sine and cosine signals generated by the light receivers and the two sine-shaped carrier voltage signals which are displaced 90° in phase are supplied to two frequency multipliers, which generate two a.c. voltage signals, which are at the carrier frequency and are displaced 90° in phase and which have been amplitude-modulated by the analog sine and cosine signals generated by the light receivers. Said a.c. voltages are combined to produce a resultant signal, which is displaced in phase from a reference signal derived from the clock pulses by a second frequency divider. That resultant signal is supplied to a phase-controlled demodulator, to which the reference signal is delivered from said second frequency divider. The second frequency divider has the same frequency ratio as the first frequency divider.

The output voltage of the phase-controlled demodulator is delivered through a low-pass filter to a pulse generator, which supplies a counter with a signal that controls the counting sense of the counter. As a result, pulses in a number depending on the instantaneous position of the scanning unit, i.e., on the fraction of a scale increment which has just been scanned, are counted by the counter in a sense which depends on the direction of the scanning movement. Counting in a sense that depends on the direction of the scanning movement means that the pulses are counted in a count-increasing sense during a scanning movement in one direction and in a count-decreasing sense during a scanning movement in the other direction. The count of the counter may be indicated by a display.

Basic disadvantages are involved in the conventional operation of the measuring instrument with a constant luminous intensity, the generation of analog signals by the light receivers, and the direct conductive coupling of the resultant signals to the phase detector, which coupling results in errors if the d.c. voltages are different. The circuit arrangement which has been described involves also the disadvantage that two a.c. voltages in quadrature must be derived also from the clock pulses so that the signal-generating circuitry is further complicated. A particularly high expenditure is involved in the modulation of the a.c. carrier signals with the analog output signals generated by the light receivers by means of frequency multipliers, which are expensive and susceptible to interference. Besides, errors may be picked up from spurious signals. Errors may occur which cannot be detected and cannot be corrected. The known instrument comprises a single counter, which must be able to count at the clock frequency in continuous operation. The clock frequency must be high to ensure that errors will be avoided even when the scanning unit is moved at a high velocity relative to the scale. Pulses which are lost or picked-up interference may result in wrong counts, which are not corrected and the errors are cumulative during a measuring operation.

OBJECTS OF THE INVENTION

It is an object of the invention to provide a method and an instrument for carrying out said method which method and instrument involve a lower circuitry expenditure and ensure exact measurements and a resolution which is high relative to the pitch of the scale. Errors in measurement resulting from picked-up interference or from an aging of components of the instrument, from soiling and from a loss of pulses to be counted should be minimized.

SUMMARY OF THE INVENTION

In the method in accordance with the invention the illumination of said light receivers is modulated at the carrier frequency so that the light receivers generate the amplitude-modulated signals, which are then processed, the clock signal is a binary signal, from which a binary signal at the carrier frequency is derived, a signal having an a.c. component derived from said carrier frequency signal is used to produce the light for illuminating said light receivers, and the carrier frequency signal is used as a reference signal to determine the phase displacement of a binary signal which has been derived from the resultant signal and which has a phase displacement depending on the instantaneously scanned increment fraction of the scale.

In accordance with the invention, simple means are used to generate the amplitude-modulated a.c. signal. The light emitters may consist of light-emitting diodes or similar light sources, which emit light that is exactly in phase with the a.c. voltage applied, virtually without a time lag and without a distortion. In most cases the a.c. voltage is superposed on a d.c. voltage which is so selected that only brightness fluctuations rather than a bright-dark operation are obtained. The frequency multipliers which were previously required and were additionally supplied with phase-displaced a.c. voltages are no longer necessary.

In principle, the 90° phase shift of one signal might be effected in that the light emitters are supplied with phase-displaced a.c. voltages. In accordance with the invention, two or more light emitters associated with respective light receivers are energized with modulated d.c. voltages which are in phase with each other and one of the modulated output signals is displaced 90° in phase before it is combined with the other modulated output signal.

In accordance with a further feature, additional pulses to be counted, which correspond to full scale increments, and additional signals indicating the direction of the scanning movement are also derived from the modulated signals. Said additional pulses and additional signals may be derived, for instance, from zero crossings of the modulated sine signals, as is usual in an operation with constant luminous intensity. In accordance with a further feature those pulses which represent full scale increments which have been scanned are counted in an increment counter and the counts of the increment counter and of the clock pulse counter are combined in a computer, which computes the result of the measurement and controls a display or an evaluating unit accordingly. During a measuring operation, full scale increments will then be counted by the increment counter and increment fractions will be measured by the clock pulse counter. As a result, the reliability of operation and the accuracy of the measurement will be increased. The detection of the full increments may be used to synchronize the clock pulse counter in that the counter is reset to zero after the scanning of each full increment.

The measuring instrument which is used to carry out that method and which is of the kind described hereinbefore is characterized in accordance with the invention in that a signal at the carrier frequency is supplied to the light emitters so that their luminous intensity varies at said frequency, the modulating means are constituted by the combination of the light emitters, the scale, the scanning gratings and the light receivers, and the circuitry which succeeds one of the light receivers incorporates a phase-shifting element for shifting the carrier frequency signal through 90° in phase.

In accordance with a further feature that portion of the circuit arrangement in which the phase detector is incorporated is capacitively coupled to the leads which carry the modulated output signals of the light receivers so that the phase detector is non-conductively coupled to the light receivers. Said portion of the circuit arrangement is used for the exact determination of the number of pulses which represent a fraction of a scale increment and owing to the capacitive coupling is supplied only with a modulated a.c. voltage so that any changes of the d.c. level, which may be due to changes in brightness, ageing, or other causes, cannot exert a detrimental influence on the detection of the phase displacement and on the result of the measurement.

BRIEF DESCRIPTION OF THE DRAWING

Further details and additional features of the invention will be apparent from the following detailed description of an embodiment of the invention, reference being made to the accompanying drawing in which.

SPECIFIC DESCRIPTION

Figure 1:
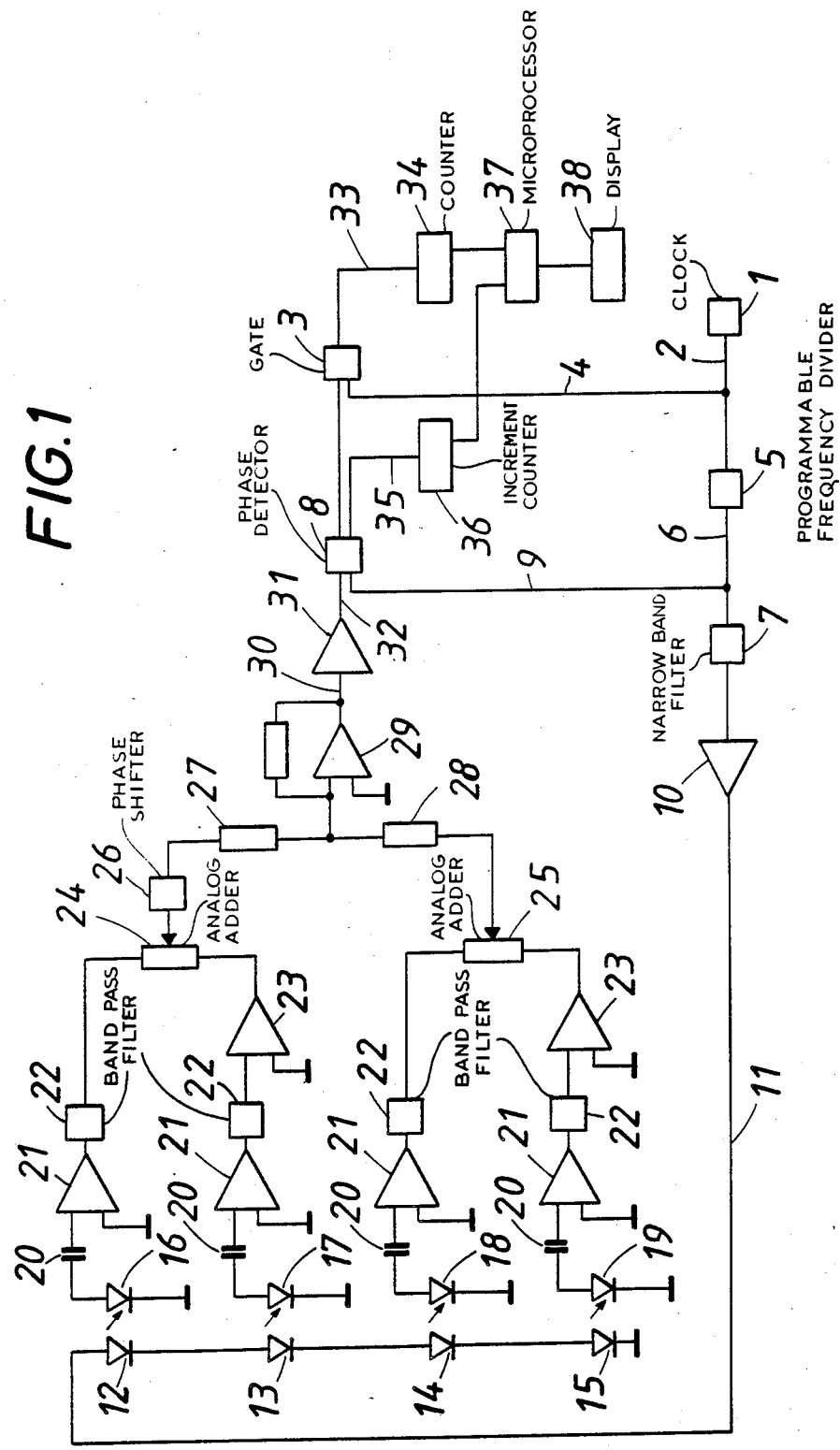
FIG. 1 is a block circuit diagram showing a measuring instrument.

Illustrative embodiments of the invention will now be described more in detail with reference to the drawing. The embodiments described are used to measure lengths. Angles can be measured in an analogous manner by a scanning movement performed along a circular scale.

In the embodiment shown in FIG. 1, a clock 1 or oscillator delivers square wave signals, which can be converted to digital data, via an output lead 2 to a programmable frequency divider 5 and via a control lead 4 to a gate 3, which will be described hereinafter. As will also be described hereinafter the frequency ratio of the frequency divider 5 determines the number of pulses which will be generated in the circuit arrangement in accordance with the invention during the scanning of an increment of the scale, which will be described hereinafter. The programmable frequency divider delivers an output signal or reference signal to a lead 6. That output signal of the frequency divider 5 must be at least twice and preferably an integral multiple in excess of two of the modulating frequency, which is determined by the pitch of the scale, the pitch of the scanning gratings, and the velocity of the scanning movement. In the embodiment shown in FIG. 1 the scale and the gratings have an incremental pitch of 0.2 mm and it is assumed that the maximum velocity of the scanning movement is 1 meter per second so that the highest modulating frequency is 5 kHz. The clock has a clock frequency of 50 kHz and the programmable frequency divider 5 is operated at a frequency ratio of 1:200. This means that the output frequency of the frequency divider (carrier frequency) is ten times the highest modulating frequency. The output of the programmable frequency divider 5 is delivered to the input terminal of a narrow-band filter 7 and is delivered as a digital signal via a lead 9 to a phase detector 8.

The digital output signal of the programmable frequency divider 5 is converted by means of the narrow-band filter 7 and a succeeding amplifier 10 to a signal having a d.c. component and a sine or sinusoidal component at the output frequency of the frequency divider 5. That signal is supplied via a lead 11 to one or more (in the present embodiment to four) light-emitting diodes 12 to 15. The brightness of the light emitters 12 to 15 varies in step with the carrier frequency signal supplied via the lead 11.

The light-emitting diodes 12 to 15 illuminate respective light receivers 16 to 19, which have been represented by photodiodes. The light projected from each of the light-emitting diodes 12 to 15 to the associated one of the photodiodes 16 to 19 is incident on and/or transmitted or reflected by an incremental scale and a scanning grating before it is incident on the photodiode. Each scanning grating is associated with one of the light receivers 16 to 19 and the scanning gratings extend and are spaced apart along the scale and having the same pitch, which may but need not be the same as the incremental pitch of the scale and may be an integral multiple of the pitch of the scale. The scanning gratings are offset by different fractions of the incremental pitch of the scale from the adjacent increments of the scale. The light emitters 12 to 15, the scanning gratings and the light receivers 16 to 19 are incorporated in a scanning unit, which will be described more in detail hereinafter and which is movable along the scale. The amounts by which the gratings are offset are so selected that the bright and dark fields of the scanning gratings are in register with the bright and dark fields of the scale in different positions of the gratings relative to the scale. If the light-emitting diodes 12 to 15 were supplied only with direct current in the conventional manner, so that their luminous intensity would be constant, the output voltages of the light receivers 16 to 19 would have a sine component having a wavelength that is equal to the pitch of the scale. In that case the output signals of the light receiver 17 would be displaced 180°, the output signals of the light receiver 18 would be displaced 90°, and the output signals of the receiver 19 would be displaced 270° in phase from the output signals of the light receiver 19.

Because the light-emitting diodes 12 to 15 are energized via lead 11 at the carrier frequency, the output signal of each of the light receivers 16 to 19 is also a carrier frequency signal which has been amplitude-modulated as a result of the scanning operation. The output signal of each of the light receivers 16 to 19 is delivered via a capacitor 20 to an amplifier 21, which is associated with the respective one of the light receivers 16 to 19. Owing to the capacitive coupling by the capacitors 20, the evaluating unit is not conductively connected to the signal-generating unit so that d.c. components of the signals and signal distortions caused by a drifting of the d.c. voltage will be avoided. Any interference, such as a picked-up interference, which would be permitted by a conductive coupling is also avoided so that the noise level of the signals to be evaluated is greatly reduced.

In the embodiment shown in FIG. 1 each amplifier 21 is succeeded by a band pass filter 22, which serves to eliminate the low-frequency scanning sine signal as well as picked-up interference and noise from the output of the amplifier. Those of the filters 22 which are coupled to the light receivers 17 and 19 and transmit the carrier frequency signal which is modulated with phase displacements of 180 and 270 degrees, respectively, are succeeded by inverters 23. The output of each of the band pass filters 22 which are not succeeded by an inverter 23 and the output of that inverter 23 which is modulated in phase with the output of said band pass filter are combined in an analog adder 24 or 25. The analog adder 24 is succeeded by a phase-shifting circuit 26, which effects a phase shift of 90° in the carrier frequency input signal. The phase-shifted output of the phase-shifting circuit 26 and the output of the analog adder 25 are supplied to another analog adder, which comprises two resistors 27, 28 and an operational amplifier 29. The circuitry described thus far delivers to the output lead 30 of the analog adder 27 to 29 a signal at the carrier frequency, i.e., at the frequency of the signal on lead 11. The phase displacement of the signal on the lead 30 is exactly proportional to the offset of the increments of the grating associated with the light receiver 16 relative to the adjacent increments of the scale, i.e., to the increment fraction by which the scanning unit has been displaced relative to the scale from a position in which the increments of the grating associated with the light receiver 16 are exactly in register with the increments of the scale. The signal on lead 30 is converted by a comparator 31 to a square wave signal, which is delivered in a lead 32 to a phase detector 8, to which the lead 9 from the output terminal of the frequency divider 5 is also connected. The phase detector 8 is operated to control a gate 3 in known manner so that the gate 3 is opened in response to the leading edge of each pulse of the reference signal in lead 9 and is closed in response to the leading edge of each pulse in lead 32. As a result, the gate 3 is open for a time which is proportional to the phase displacement of the signal in lead 30 relative to the signal on lead 11. During that time the output pulses of the oscillator 1 are transmitted via the lead 4 and the now open gate 3 and a lead 33 to a clock pulse counter 34, which counts the number of clock pulses of a pulse train so that the count of the counter 34 will be proportional to the scanned fraction of a scale increment. In the present embodiment, the counter 34 will have a count of 200 when a scale increment has been completely scanned.

In the present embodiment, a special phase detector circuit 8 is provided for detecting the completion of the scanning of a scale increment and the direction of the scanning movement and for determining whether the count is to be increased or decreased. In response to each maximum and each minimum of the signal obtained by the summation of the modulated signals, the phase detector 8 delivers a control signal via a lead 35 to an increment counter 36, the count of which indicates the number of the full scale increments which are disposed between the point to which the scale has just been scanned and a preselected or predetermined zero point. Only one lead 35 is shown. In practice, the phase detector 8 detects also the scanning direction and in dependence on that direction applies a signal to an "up" or "down" input terminal of the counter 36. The counts of the counters 34 and 36 are delivered to a microprocessor 37, which controls a display 38 or is connected to a control circuit or to a remote display.

The microprocessor 37 may be omitted if the frequencies and the pitches of the scale and of the grating are so selected that the pulses counted by the increment counter 36 correspond to decades of a metric scale or in case of a measurement of arc lengths to conventional angular scale divisions or correspond to other conventional scale divisions to be displayed and if the frequency ratio of the programmable frequency divider is properly selected. In case of a display of metric units, the frequency ratio might be 1:100 so that the unit digit of the count of the increment counter 36 corresponds to units of 1 mm or 0.1 mm. In that case the count of the clock pulse counter 34 will correspond to units of one-hundredths or one-thousandth of a millimeter and can be directly displayed.

It is emphasized that the gate 3 need not be opened for a counting of clock pulses in response to each output pulse of the frequency divider 5 because it will be sufficient in practice to open the gate only in response to each n-th output pulse of the frequency divider, where n is an integer. In practice the instantaneous count of the clock pulse counter 34 is interesting in most cases only during a slow scanning movement and at the end of a measurement.

In the illustrative embodiment shown in FIG. 1 the signals which determine the count of the increment counter 36 are detected by the phase detector 8. Alternatively, the modulating signals, i.e., the sine signals having a wavelength that is equal to the scale pitch, might be generated by filters which are connected in parallel to the filters 22 and in which the carrier frequency component is eliminated, or by other demodulating means, and the signals may subsequently be delivered to a counting circuit which is responsive to the leading edges so that a count corresponding to the integral number of increments from the zero point of the scale or from a selected zero point is obtained in the counter 36 or in a corresponding evaluating or display device.

Figure 2:
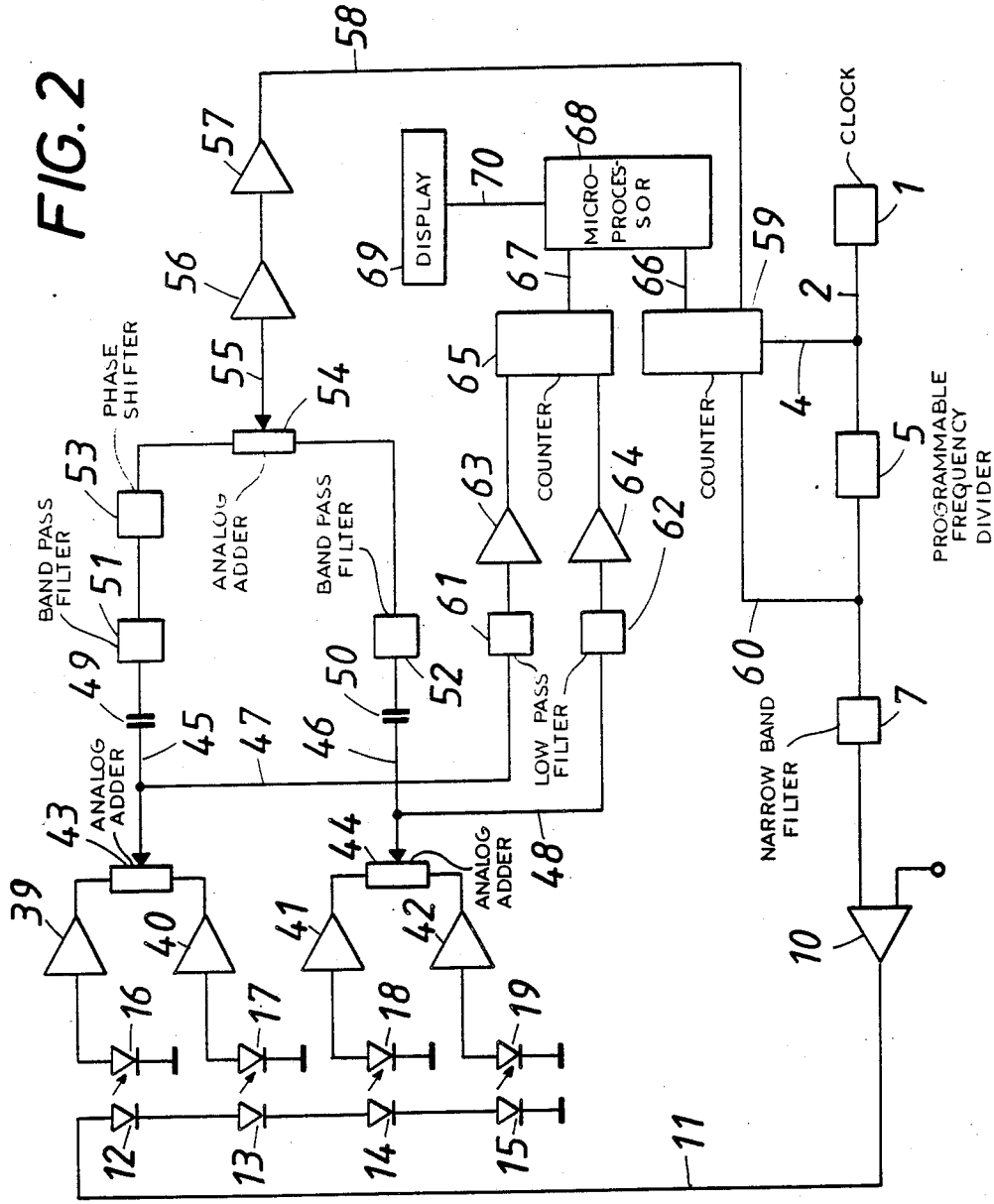
FIG. 2 is a circuit diagram of a simplified measuring instrument.

Such an embodiment is shown in FIG. 2, in which identical or similar components are designated with the same reference numerals as in FIG. 1.

The circuitry for energizing the light-emitting diodes 12 to 15 is similar to the circuitry shown in FIG. 1. The amplifier 10 shown in FIG. 1 is replaced by a d.c. comparator in which an adjustable d.c. voltage component is introduced.

Important differences and simplifications in comparison with the circuit arrangement of FIG. 1 reside in that the output of each of the light receivers 16 to 19 is delivered to an associated amplifier 39, 40, 41 or 42 and those outputs of said amplifiers which are displaced 180° in phase are directly combined by analog adders 43, 44. The outputs of the analog adders 43, 44 are delivered to leads 45 and 46, respectively, and from the latter to branch leads 47 and 48, respectively. The sum signals on leads 45 and 46 are processed in respective processing channels. One of said channels is coupled via capacitors 49, 50 and serves to detect the phase displacement of the signal in said channel from the reference signal. The channel connected via leads 47 and 48 serves to generate demodulated signals, which have a wavelength corresponding to the scale pitch, and to derive increment pulses and direction-indicating signals from said modulating signals.

In that channel which is non-conductively coupled via the capacitors 49, 50 so that it carries no d.c. voltage components, the signals delivered via leads 45, 46 are transmitted by band pass filters 51, 52. The band pass filter 51 is succeeded by a phase-shifting circuit 53, which effects a 90° phase shift. The output of the phase-shifting circuit 53 and the output of the filter 52 are delivered to an analog adder 54, which has a tap 55 that is connected to the input terminal of an amplifier 56. The output of the amplifier 56 is connected to a comparator 57, which generates an output signal that is timed in dependence on the phase displacement of the output of the amplifier 56 from the signal in line 11. That output signal is delivered via a lead 58 to a stop input terminal of a clock pulse counter 59, which has a start input terminal that is connected by a lead 60 to the output terminal of the programmed frequency divider 5. The leads 58, 60 are functionally equivalent to the leads 9 and 32 in FIG. 1 but are used to control a clock pulse counter 59 having start and stop input terminals rather than a gate. The counting input terminal of the clock pulse counter 59 is connected by a lead 4 to the output terminal of the clock 1 and between the start and stop commands applied to its start and stop input terminals counts the clock pulses so that the counted number of said pulses is directly proportional to the phase displacement of the modulation of the carrier frequency signal. In the embodiment shown in FIG. 2, said pulses can be counted by circuitry which is much less expensive than in the embodiment shown in FIG. 1 and an important advantage resides in that conventional circuits can be used in the arrangement as far as to the analog adders 43, 44 because the light emitters 12 to 15, the light receivers 16 to 19, the amplifiers 39 to 42 and the analog adders 43, 44 may be used in the same manner in conventional instruments which are operated with a constant luminous intensity and used to measure lengths and angles. Only the means for energizing the light emitters and the means for evaluating the outputs of the analog adders differ from the usual instruments operating with a constant luminous intensity.

The leads 47, 48 are connected to low-pass filters 61, 62 or to sample-and-hold means or similar circuitry, by which signals corresponding to the amplitude modulation of the carrier frequency signal are derived from the outputs of the analog adders 43, 44. In the embodiment shown in FIG. 2 said derived signals consist of two sine signals, which are in quadrature and have a wavelength that is equal to the scale pitch. Said derived signals are transformed into square wave signals by means of comparators or Schmitt triggers or similar circuits, e.g., in response to their zero crossings, so that increment pulses and direction-indicating signals are obtained, which are delivered to an increment counter 65 for counting the complete scale increments which have been scanned. The sum of the counts of the two counters 59 and 65 is the result of the measurement. The counters 59 and 65 are connected by leads 66, 67 to a microprocessor 68, which receives also a direction-indicating signal from the increment counter 65. In the simplest case the microprocessor computes the sum of the counts of the counters 59 and 65 with the correct place values and that sum is then displayed as the result of the measurement by a display 69, which is connected to a lead 70. It will be understood that the signals and counts can be evaluated and combined by different methods. Instead of a delivery of the clock pulses via the lead 4 to a clock pulse counter 59 having start and stop input terminals, said clock pulses may be used to designate an address in a stored interpolation table. Besides, instead of controlling a display 69, the microprocessor 68 may be a component of a path control system or of an industrial robot.

In practice a high resolution can be obtained with the circuit arrangement in accordance with the invention even if the scale has a relatively large pitch, provided that the frequency ratio of the programmable frequency divider is sufficiently high or that an interpolation is effected. It is preferable to use the same circuit arrangement with scales which differ in pitch and to select a desired frequency ratio for the programmable frequency divider. In that case that frequency divider may be provided with fixed terminals for length-measuring instruments having different predetermined scale and grating pitches.

Figure 3:
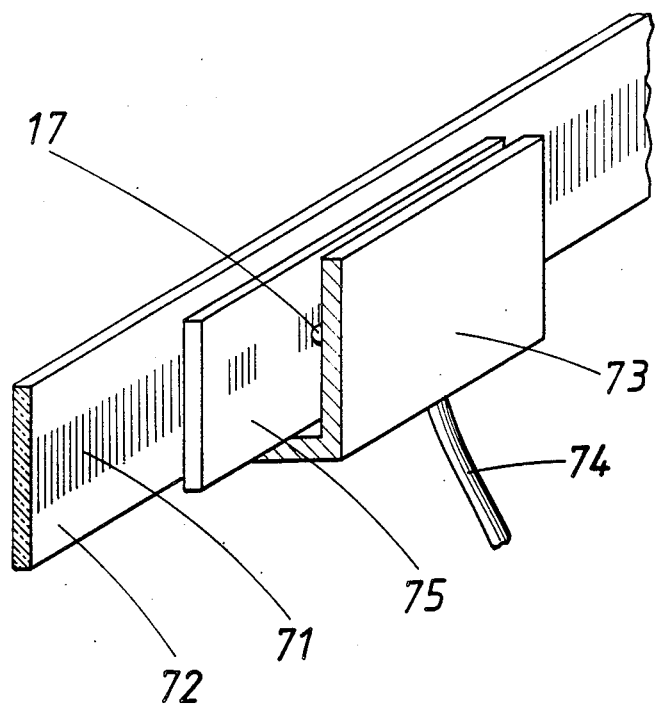
FIG. 3 is a diagrammatic showing of the incremental scale and the scanning unit.

A practical embodiment is shown in FIG. 3 and comprises a transparent scale 72, which has incremental increments indicated by graduations 71. The scanning unit comprises a U-shaped slider 73, which embraces the scale 72 and is slidable along the same. That leg of the slider which is disposed on one side of the scale carries the light-emitting diodes 12 to 15. The scanning gratings and the other leg of the slider 73 are disposed on the other side of the scale. This other leg, which is not visible in FIG. 3, carries the light receivers 16 to 19, each of which is disposed behind one of the gratings 75. The scanning gratings 75 are carried by the slider 73 and spaced apart along the scale and are offset from the adjacent increments of the scale by different fractions of a scale increment. Only the light receiver 17 is shown in FIG. 3. The light emitters and light receivers carried by the slider 73 are connected to the power supply and evaluating circuitry by leads combined in a cable 74.

We claim:

1. In a method of measuring the extent of a movement, comprising
providing an incremental scale,
providing a scanning unit, which comprises a plurality of scanning gratings, which are spaced apart along said scale and are offset by different fractions of an increment of said scale from adjacent increments of said scale, and a plurality of light receivers associated with respective ones of said gratings,
moving said scanning unit along said scale and at the same time illuminating said light receivers with light which has been projected onto said scale and which is incident on each of said light receivers from the grating associated therewith so that the illumination of each of said light receivers varies in accordance with a sine function that has a spatial frequency related to the pitch of said scale and is displaced in phase from the sine function of the illumination of another of said light receivers,
generating amplitude-modulated electric signals which are at a predetermined carrier frequency and are displaced in phase from each other in response to said illumination as said scanning unit is moved along said scale,
generating a reference signal at said carrier frequency,
combining said amplitude-modulated signals to generate an analog resultant signal which is displaced in phase from said reference signal by a phase displacement that is proportional to the instantaneously scanned fraction of an increment of said scale,
processing said analog resultant signal to generate in dependence on its phase displacement a control signal,
controlling by means of said control signal the counting of clock pulses in a number that depends on said phase displacement, and
counting said clock pulses by a clock counter in a sense which depends on the direction in which said scanning unit is moved along said scale,
the improvement residing in that
said clock pulses are generated at a frequency which is a multiple of said carrier frequency,
a binary carrier frequency signal at said carrier frequency is derived from said clock pulses and used as said reference signal,
an energizing signal having an a.c. component at said carrier frequency is derived from said binary carrier frequency signal and used to generate the light for illuminating said light receivers so that amplitude-modulated signals are generated by said light receivers,
said analog resultant signal is transformed into a binary resultant signal have relative to said reference signal a time lag that is proportional to said phase displacement, and
said binary resultant signal and said reference signal are processed to generate said control signal, said light for illuminating said light receivers being generated by a plurality of light emitters associated with respective ones of said light receivers,
said light emitters being each energized with a respective energizing signal having an a.c. component with said energizing signals being in phase with each other, and one of said amplitude-modulated signals being displaced 90° in phase before said amplitude-modulated signals are combined to generate said analog resultant signal.

2. The improvement set forth in claim 1 as applied to a method of measuring lengths.

3. The improvement set forth in claim 1 as applied to a method of measuring angles.

4. The improvement set forth in claim 1, wherein increment pulses indicating the scanning of full scale increments and direction-indicating signals indicating the direction in which said scanning unit is moved along said scale are derived from said amplitude-modulated signals.

5. The improvement set forth in claim 4, wherein
said increment pulses are counted by an increment counter, and
the counts of said increment counter and of said clock pulse counter are combined in a computer to compute the result of the measurement.

6. The improvement set forth in claim 5, wherein said result of the measurement is displayed.

7. The improvement set forth in claim 5, wherein an evaluating unit is controlled by said computer in dependence on said result of the measurement.

8. In a measuring instrument for measuring the extent of a movement, comprising
an incremental scale,
a scanning unit which is movable along said scale and comprises a plurality of scanning gratings, which are spaced apart along said scale and are offset by different fractions of an increment of said scale from adjacent increments of said scale, a plurality of light receivers associated with respective ones of said gratings, and a plurality of light emitters for illuminating respective ones of said light receivers with light which has been projected onto said scale and which is incident on each of said light receivers from the grating associated therewith so that the illumination of each of said light receivers varies in accordance with a sine function that has a spatial frequency related to the pitch of said scale and is displaced in phase from the sine function of the illumination of another of said light receivers,
means for generating amplitude-modulated electric signals which are at a predetermined carrier frequency and are displaced in phase from each other in response to said illumination as said scanning unit is moved along said scale,
a reference signal generator for generating a reference signal at said carrier frequency,
signal-combining circuitry for combining said amplitude-modulated signals to generate an analog resultant signal which is displaced in phase from said reference signal by a phase displacement that is proportional to the instantaneously scanned fraction of an increment of said scale,
a clock for generating a clock signal,
a clock counter for counting in dependence on said clock signal, and
signal-processing and control circuitry for processing said analog resultant signal to produce in dependence on its phase displacement a control signal, for controlling by said control signal the time of the counting operation of said clock counter in dependence on said phase displacement, and for controlling in response to said amplitude-modulated signals the sense of the counting operation of said clock counter in dependence on the direction in which said scanning unit is moved along said scale,
the improvement residing in that
said clock is operable to generate said clock signal as clock pulses at a frequency which is a multiple of said carrier frequency,
said reference signal generator is operable to generate said reference signal as a binary carrier frequency signal derived from said clock pulses and to energize said light emitters with a signal having an a.c. component at said carrier frequency, and
said signal-processing and control circuitry comprises a signal-transforming circuit, which is operable to transform said analog resultant signal into a binary resultant signal having from said reference signal a delay which is proportional to said phase displacement, and a phase detector for detecting said delay and for generating said control signal in dependence on said delay,
said processing and control circuitry comprising a gate arranged to receive said clock pulses and said control signal and arranged to transmit said clock pulses to said counter from the occurrence of the leading edge of a pulse of said reference signal to the occurrence of the leading edge of the next pulse of said binary resultant signal,
said signal-combining circuitry comprising a phase-shifting circuit connected between one of said light receivers and said output stage and operable to effect a phase shift of one of said amplitude-modulated signals through 90° with respect to said carrier frequency.

9. The improvement set forth in claim 8, wherein said reference signal generator comprises a frequency divider connected to said clock to receive said clock pulses.

10. The improvement set forth in claim 8, wherein said signal-combining circuitry is operable to generate two of said amplitude-modulated signals in quadrature and comprises an output stage for combining said two amplitude-modulated signals and for deriving said analog resultant signal therefrom.

11. The improvement set forth in claim 8, wherein
four of said light receivers are provided,
four of said gratings are provided, adjacent ones of said gratings are offset from adjacent increments of said scale by distances which differ by one-fourth of an increment of said scale,
said light receivers constitute two pairs of light receivers for generating two pairs of said amplitude-modulated signals in such a manner that the amplitude-modulated signals of one of said pairs are displaced 180° in phase from each other and are displaced 90° in phase from the amplitude-modulated signals of the other pair,
said signal-combining circuitry comprises two analog adders, each of which is arranged to derive a sum signal from two of said amplitude-modulated signals which are displaced 180° in phase,
said phase-shifting circuit is arranged to receive said sum signal from one of said analog adders,
said signal-combining circuitry comprises an output analog adder for combining the outputs of the other of said two analog adders and of said phase-shifting circuit and for generating said analog resultant signal.

12. The improvement set forth in claim 11, wherein said signal-combining circuitry comprises two inverters, each of which is connected between said light receivers of one of said pairs and the analog adder for combining said amplitude-modulated signals generated by said light receivers of said pair.

13. The improvement set forth in claim 8, wherein capacitor means are connected in circuit between said light receivers and said phase detector.

14. The improvement set forth in claim 8, wherein said means for generating said amplitude-modulated signals comprise said light emitters, said scale, said scanning gratings and said light receivers.

15. The improvement set forth in claim 8, wherein
said pulse counter has a clock pulse input arranged to receive said clock pulses, a start input arranged to receive said reference signal and a stop input arranged to receive said control signal.

16. The improvement set forth in claim 8, wherein said signal-processing and control circuitry comprises circuitry for controlling said counting operation in dependence on changes of the modulation of said amplitude-modulated signals.

17. The improvement set forth in claim 8, wherein
an increment detector is provided for detecting full increments of said scale which have been scanned,
a direction detector is provided for detecting the direction in which said scanning unit is moved along said scale,
said increment detector and direction detector are responsive to changes of the modulation of said amplitude-modulated signals, and
an increment counter is provided for counting said full increments in a sense depending on said direction under the control of said increment detector and direction detector.

18. The improvement set forth in claim 8, wherein modulation-detecting means are provided, which are arranged to detect the amplitude-modulation of said amplitude-modulated signals.

19. The improvement set forth in claim 18, wherein said modulation-detecting means comprise filters for eliminating said carrier frequency from said amplitude-modulated signals.

20. The improvement set forth in claim 18, wherein said modulation-detecting means comprise low-pass filters.

21. The improvement set forth in claim 18, wherein said modulation-detecting means comprise sample-and-hold circuits.

22. The improvement set forth in claim 18, wherein a direction detector is provided for detecting the direction in which said scanning unit is moved along said scale, said direction detector being controlled by said modulation-detecting means and being arranged to control the sense in which said clock pulses are counted by said clock counter.

23. The improvement set forth in claim 22, wherein
an increment detector is provided for detecting full increments of said scale which have been scanned under the control of said modulation-detecting means,
an increment counter is provided for counting said full increments under the control of said increment detector, and
said increment counter is arranged to count said full increments in a sense controlled by said direction detector.

24. The improvement set forth in claim 9, wherein said signal-transforming circuit comprises a comparator for generating said binary resultant signal.

* * * * *